(12) United States Patent
Kawaguchi

(10) Patent No.: US 9,206,584 B2
(45) Date of Patent: Dec. 8, 2015

(54) HYBRID WORKING MACHINE AND METHOD OF CONTROLLING HYBRID WORKING MACHINE

(71) Applicant: Komatsu Ltd., Tokyo (JP)

(72) Inventor: Tadashi Kawaguchi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/992,386

(22) PCT Filed: Nov. 20, 2012

(86) PCT No.: PCT/JP2012/080060
§ 371 (c)(1),
(2) Date: Jun. 7, 2013

(87) PCT Pub. No.: WO2013/175658
PCT Pub. Date: Nov. 28, 2013

(65) Prior Publication Data
US 2015/0081147 A1 Mar. 19, 2015

(30) Foreign Application Priority Data

May 23, 2012 (JP) .................. 2012-117848

(51) Int. Cl.
*B60W 20/00* (2006.01)
*E02F 9/12* (2006.01)
(Continued)

(52) U.S. Cl.
CPC .......... *E02F 9/123* (2013.01); *B60K 6/485* (2013.01); *B60L 3/0046* (2013.01); *B60L 11/005* (2013.01); *B60L 11/14* (2013.01); *B60L 15/2009* (2013.01); *B60W 10/26* (2013.01); *B60W 20/00* (2013.01); *E02F 9/2075* (2013.01); *E02F 9/2091* (2013.01); *E02F 9/2095* (2013.01);
(Continued)

(58) Field of Classification Search
CPC ....... E02F 9/123; E02F 9/2091; E02F 9/2095; B60K 6/485; B60L 11/14; B60L 2240/441; B60L 2240/421; B60L 2200/40; B60L 2240/423; B60Y 2200/412
See application file for complete search history.

(56) References Cited

U.S. PATENT DOCUMENTS

| 7,740,092 B2 | 6/2010 | Bender |
| 8,214,110 B2 | 7/2012 | Morinaga et al. |
| 2009/0167079 A1 | 7/2009 | Nozawa et al. |

FOREIGN PATENT DOCUMENTS

| CN | 101309810 A | 11/2008 |
| CN | 101317321 A | 12/2008 |

(Continued)

OTHER PUBLICATIONS

International Search Report dated Feb. 12, 2013, issued for PCT/JP2012/080060.

*Primary Examiner* — Redhwan K Mawari
*Assistant Examiner* — Edward Torchinsky
(74) *Attorney, Agent, or Firm* — Locke Lord LLP

(57) ABSTRACT

A hybrid excavator includes an engine, a generator motor, a capacitor, a swing motor, a transformer, a transformer temperature sensor, a capacitor temperature sensor, and a hybrid controller. An overheat suppression control unit of the hybrid controller changes the amount of power regenerated by the swing motor supplied to the capacitor and the amount of power regenerated by the swing motor supplied to the generator motor based on a temperature of the transformer detected by the transformer temperature sensor and a temperature of the capacitor detected by the capacitor temperature sensor.

15 Claims, 9 Drawing Sheets

(51) Int. Cl.
*B60K 6/485* (2007.10)
*B60W 10/26* (2006.01)
*B60L 3/00* (2006.01)
*B60L 11/00* (2006.01)
*B60L 11/14* (2006.01)
*B60L 15/20* (2006.01)
*E02F 9/20* (2006.01)

(52) U.S. Cl.
CPC .......... *B60L 2200/40* (2013.01); *B60L 2210/40* (2013.01); *B60L 2220/14* (2013.01); *B60L 2240/36* (2013.01); *B60L 2240/421* (2013.01); *B60L 2240/423* (2013.01); *B60L 2240/441* (2013.01); *B60Y 2200/412* (2013.01); *B60Y 2400/112* (2013.01); *B60Y 2400/114* (2013.01); *Y02T 10/6226* (2013.01); *Y02T 10/642* (2013.01); *Y02T 10/70* (2013.01); *Y02T 10/7022* (2013.01); *Y02T 10/7077* (2013.01); *Y02T 10/7241* (2013.01); *Y02T 10/7275* (2013.01)

(56) References Cited

FOREIGN PATENT DOCUMENTS

| | | | | |
|---|---|---|---|---|
| CN | 102139695 A | 8/2011 | | |
| JP | 2001-016703 A | 1/2001 | | |
| JP | 2001-054203 A | 2/2001 | | |
| JP | 2002-238105 A | 8/2002 | | |
| JP | 2002238105 A | * | 8/2002 | .............. B60L 11/12 |
| JP | 2002-359935 A | 12/2002 | | |
| JP | 2002359935 A | * | 12/2002 | ................ H02J 7/14 |
| JP | 2009-235707 A | 10/2009 | | |
| JP | 2009235707 A | * | 10/2009 | |
| JP | 2011-079444 A | 4/2011 | | |
| JP | 2012-051515 A | 3/2012 | | |
| JP | 2012051515 A | * | 3/2012 | |
| WO | WO-2008/120682 A1 | 10/2008 | | |

* cited by examiner

ND METHOD OF CONTROLLING HYBRID
HYBRID WORKING MACHINE AND METHOD OF CONTROLLING HYBRID WORKING MACHINE

FIELD

The present invention relates to a hybrid working machine which includes an internal combustion engine, a generator motor, a battery, and a generator driven by receiving power from at least one of the generator motor and the battery and a method of controlling the hybrid working machine.

BACKGROUND

There is known a hybrid working machine which drives a generator motor by an engine and drives an electric motor by power generated by the generator motor so as to operate a working unit and the like. For example, Patent Literature 1 discloses a technique for preventing the overheat of an electric unit mounted on the hybrid working machine.

CITATION LIST

Patent Literature

Patent Literature 1: WO 2008/120682 A

SUMMARY

Technical Problem

In the hybrid working machine, when an electric motor provided therein, for example, an electric motor that swings an upper swing body of a hybrid excavator generates power (regeneration energy) by performing a regeneration action while being changed from an acceleration state to a deceleration state, the power is stored in a battery provided in the hybrid working machine and the stored power is supplied to the electric motor when accelerating the electric motor. In this way, the regeneration energy is effectively used in general. In this case, although disposed are the battery and a transformer between the battery and the electric motor, there is a need to perform a management in which the regeneration energy regenerated by the electric motor does not exceed the range of the power which may be input to the battery and the transformer. Patent Literature 1 does not disclose a configuration which suppresses an increase in temperature of the transformer and the battery when regenerating the electric motor, and hence there is a room for the improvement.

It is an object of the invention to suppress an increase in temperature of a transformer and a battery when regenerating an electric motor mounted on a hybrid working machine.

Solution to Problem

According to the present invention, a hybrid working machine comprises: an internal combustion engine; a generator motor which is connected to an output shaft of the internal combustion engine; a battery which stores power generated by the generator motor and supplies the power to the generator motor; an electric motor which is driven by at least one of the power generated by the generator motor and the power stored in the battery; a transformer which is installed between the battery and the generator motor and between the battery and the electric motor; a transformer temperature detecting sensor which detects a temperature of the transformer; a battery temperature detecting sensor which detects a temperature of the battery; and an overheat suppression control device which changes the amount of the power regenerated by the electric motor supplied to the battery and the amount of the power regenerated by the electric motor supplied to the generator motor based on the temperature of the transformer detected by the transformer temperature detecting sensor and the temperature of the battery detected by the battery temperature detecting sensor.

In the present invention, it is preferable that the overheat suppression control device changes the amount of the power regenerated by the electric motor supplied to the battery and the amount of the power regenerated by the electric motor supplied to the generator motor based on a first power running output that is determined based on voltage of the battery and allow the generator motor to perform power running and a second power running output that is determined based on input and output power of the electric motor and battery side input limit power based on the temperature of the battery and the temperature of the transformer and allow the generator motor to perform power running.

In the present invention, it is preferable that the second transformer input limit power is constant up to a predetermined temperature when the temperature of the transformer increases, and the battery input limit power is constant up to a predetermined temperature when the temperature of the battery increases.

In the present invention, it is preferable that the battery side input limit power is determined based on first transformer input limit power determined by the voltage of the battery, second transformer input limit power determined by the temperature of the transformer, and battery input limit power determined by the temperature of the battery.

In the present invention, it is preferable that in the first power running output, a path changing with an increase in voltage of the battery is different from a path changing with a decrease in voltage of the battery.

In the present invention, it is preferable that in the first power running output, a path changing with an increase in voltage of the battery is different from a path changing with a decrease in voltage of the battery, in the second transformer input limit power, a path changing with an increase in temperature of the transformer is different from a path changing with a decrease in temperature of the transformer, and in the battery input limit power, a path changing with an increase in temperature of the battery is different from a path changing with a decrease in temperature of the battery.

In the present invention, it is preferable that the overheat suppression control device changes the amount of the power regenerated by the electric motor supplied to the battery and the amount of the power regenerated by the electric motor supplied to the generator motor based on second power running output that is determined based on the input and output power of the electric motor and the battery side input limit power based on the temperature of the battery and the temperature of the transformer and allow the generator motor to perform power running.

In the present invention, it is preferable that when the electric motor performs power running, the overheat suppression control device decreases a target value of power generated by the generator motor as a rotation speed of the electric motor increases.

In the present invention, it is preferable that the electric motor swings an upper swing body of an excavator.

According to the present invention, a method of controlling a hybrid working machine including an internal combustion engine, a generator motor which is connected to an output shaft of the internal combustion engine, a battery which stores power generated by the generator motor and supplies the power to the generator motor, an electric motor which is driven by at least one of the power generated by the generator motor and the power stored in the battery, and a transformer which is installed between the battery and the generator motor and between the battery and the second generator, the method comprises: a measurement step of measuring at least a temperature of the transformer and a temperature of the battery; and a control step of controlling the amount of the power regenerated by the electric motor supplied to the battery and the amount of the power regenerated by the electric motor supplied to the generator motor to be changed based on the temperature of the transformer and the temperature of the battery.

In the present invention, it is preferable that in the control step, the amount of the power regenerated by the electric motor supplied to the battery and the amount of the power regenerated by the electric motor supplied to the generator motor is changed based on a first power running output that is determined based on the voltage of the battery and allow the generator motor to perform power running and a second power running output that is determined based on input and output power of the electric motor and battery side input limit power based on the temperature of the battery and the temperature of the transformer and allow the generator motor to perform power running.

In the present invention, it is preferable that the second transformer input limit power is constant up to a predetermined temperature when the temperature of the transformer increases, and the battery input limit power is constant up to a predetermined temperature when the temperature of the battery increases.

In the present invention, it is preferable that the battery side input limit power is determined based on first transformer input limit power determined by the voltage of the battery, second transformer input limit power determined by the temperature of the transformer, and battery input limit power determined by the temperature of the battery.

In the present invention, it is preferable that in the first power running output, a path changing with an increase in voltage of the battery is different from a path changing with a decrease in voltage of the battery.

In the present invention, it is preferable that in the first power running output, a path changing with an increase in voltage of the battery is different from a path changing with a decrease in voltage of the battery, in the second transformer input limit power, a path changing with an increase in temperature of the transformer is different from a path changing with a decrease in temperature of the transformer, and in the battery input limit power, a path changing with an increase in temperature of the battery is different from a path changing with a decrease in temperature of the battery.

In the present invention, it is preferable that in the control step, the amount of the power regenerated by the electric motor supplied to the battery and the amount of the power regenerated by the electric motor supplied to the generator motor is changed based on second power running output that is determined based on input and output power of the electric motor and battery side input limit power based on the temperature of the battery and the temperature of the transformer and allow the generator motor to perform power running.

In the present invention, it is preferable that in the control step, when the power running action of the electric motor is performed, a target value of power generated by the generator motor decreases as a rotation speed of the electric motor increases.

The invention may suppress an increase in temperature of a transformer and a battery when regenerating an electric motor mounted on a hybrid working machine.

DESCRIPTION OF EMBODIMENTS

Figure 1:
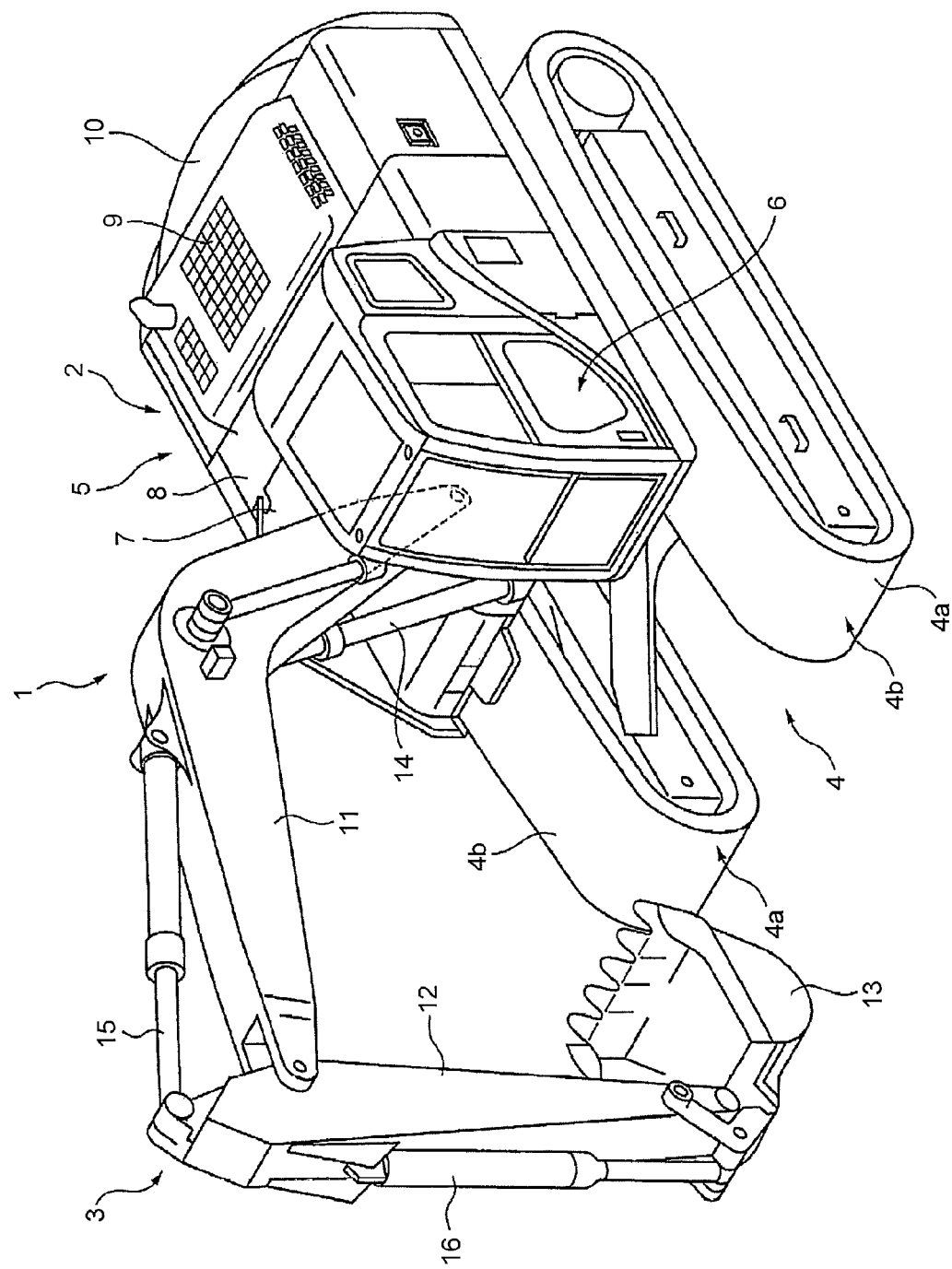
FIG. 1 is a perspective view illustrating a hybrid excavator which is an example as a hybrid working machine.

A mode for carrying out the invention (an embodiment) will be described in detail by referring to the drawings.

Figure 2:
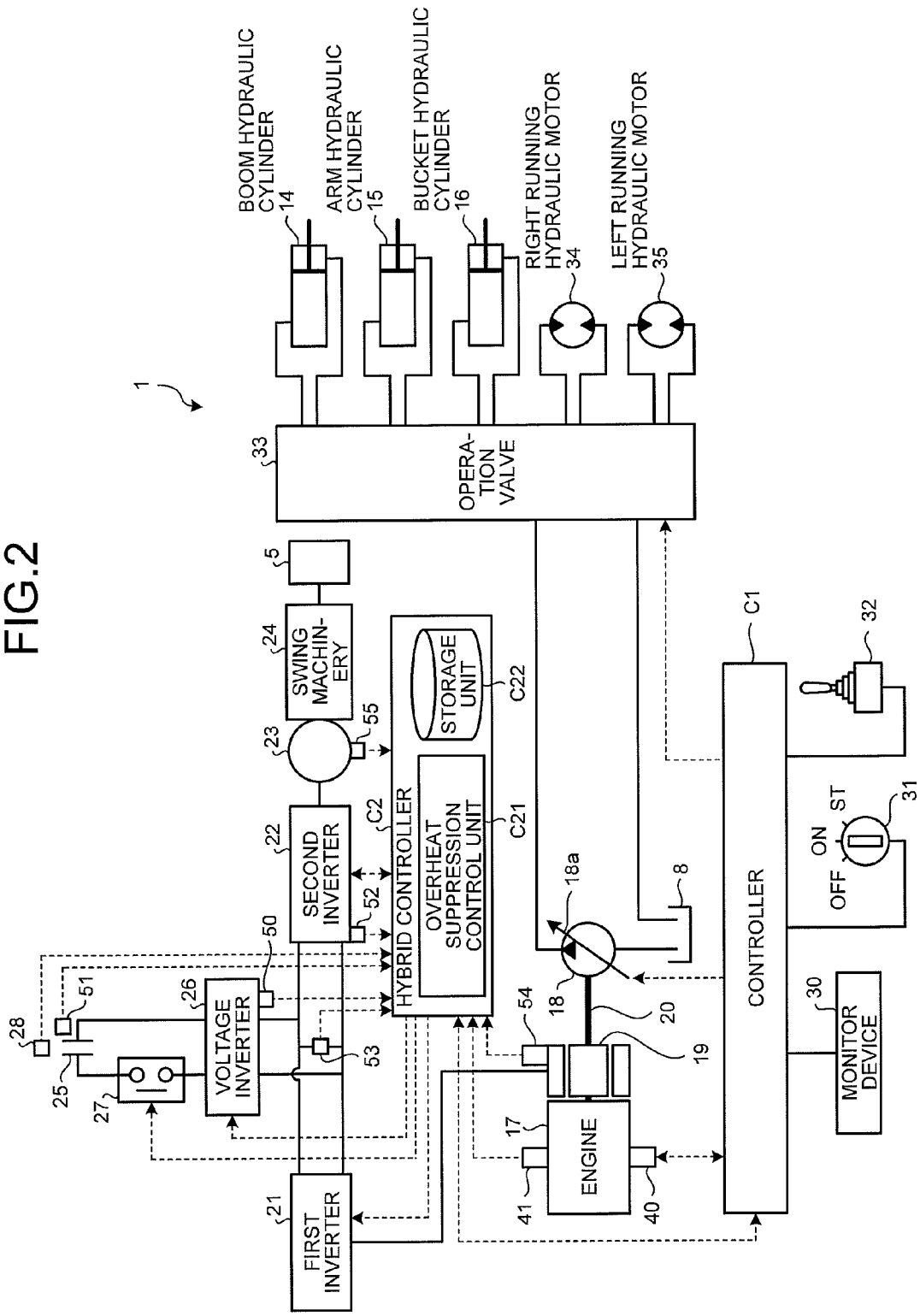
FIG. 2 is a block diagram illustrating an apparatus configuration of the hybrid excavator illustrated in FIG. 1.

FIG. 1 is a perspective view illustrating a hybrid excavator 1 which is an example as a hybrid working machine. FIG. 2 is a block diagram illustrating an apparatus configuration of the hybrid excavator 1 illustrated in FIG. 1. Furthermore, a concept of a simple working machine instead of a hybrid type includes a construction machine such as an excavator, a bulldozer, a dump truck, and a wheel loader, and the construction machine with a peculiar hybrid characteristic configuration is set as a hybrid working machine.

(Hybrid Excavator)

The hybrid excavator 1 includes a vehicle body 2 and a working unit 3. The vehicle body 2 includes a lower running body 4 and an upper swing body 5. The lower running body 4 includes a pair of running devices 4a. Each running device 4a includes a crawler track 4b. Each running device 4a drives the crawler track 4b by the rotational driving of a right running hydraulic motor 34 and a left running hydraulic motor 35 illustrated in FIG. 2 so that the hybrid excavator 1 runs.

The upper swing body 5 is provided in the upper portion of the lower running body 4 so as to be swingable. The upper swing body 5 includes a swing motor 23 as an electric motor so as to swing the upper swing body. The swing motor 23 is connected to a driving shaft of swing machinery 24 (decelerator). The rotational force of the swing motor 23 is transmitted through the swing machinery 24, and the transmitted rotational force is transmitted to the upper swing body 5 through a swing pinion and a swing circle (not illustrated) so as to swing the upper swing body 5.

The upper swing body 5 is provided with an operation room 6. Further, the upper swing body 5 includes a fuel tank 7, a hydraulic oil tank 8, an engine room 9, and a counter weight 10. The fuel tank 7 stores fuel for driving an engine 17 as an internal combustion engine. The hydraulic oil tank 8 stores hydraulic oil discharged from a hydraulic pump 18 with respect to hydraulic units which are a hydraulic cylinder such as a boom hydraulic cylinder 14, an arm hydraulic cylinder 15, and a bucket hydraulic cylinder 16 and a hydraulic motor (a hydraulic actuator) such as the right running hydraulic motor 34 and the left running hydraulic motor 35. The engine room 9 accommodates various units such as the engine 17, the hydraulic pump 18, a generator motor 19, and a capacitor 25 as a battery. The counter weight 10 is disposed behind the engine room 9.

The working unit 3 is attached to the center position of the front portion of the upper swing body 5, and includes a boom 11, an arm 12, a bucket 13, the boom hydraulic cylinder 14, the arm hydraulic cylinder 15, and the bucket hydraulic cylinder 16. The base end of the boom 11 is connected to the upper swing body 5 so as to be swingable. Further, the front end which is opposite to the base end of the boom 11 is connected to the base end of the arm 12 so as to be rotatable. The bucket 13 is connected to the front end which is opposite to the base end of the arm 12 so as to be rotatable. Further, the bucket 13 is connected to the bucket hydraulic cylinder 16 through a link. The boom hydraulic cylinder 14, the arm hydraulic cylinder 15, and the bucket hydraulic cylinder 16 are hydraulic cylinders (hydraulic actuators) which are operated in a telescopic manner by the hydraulic oil discharged from the hydraulic pump 18. The boom hydraulic cylinder 14 swings the boom 11. The arm hydraulic cylinder 15 swings the arm 12. The bucket hydraulic cylinder 16 swings the bucket 13.

In FIG. 2, the hybrid excavator 1 includes the engine 17, the hydraulic pump 18, and the generator motor 19 as driving sources. A diesel engine is used as the engine 17, and a variable displacement hydraulic pump is used as the hydraulic pump 18. The hydraulic pump 18 is, for example, a swash plate type hydraulic pump which changes the pump capacity by changing the tilting angle of a swash plate 18a, but the invention is not limited thereto. The engine 17 is provided with a rotation sensor 41 which detects the rotation speed (the engine speed per unit time) of the engine 17. A signal which represents the rotation speed (the engine rotation speed) of the engine 17 detected by the rotation sensor 41 is input to a hybrid controller C2. The rotation sensor 41 is operated by receiving power from a battery (not illustrated), and detects the engine rotation speed of the engine 17 as long as a key switch 31 to be described later is operated to an on (ON) or start (ST) position.

The hydraulic pump 18 and the generator motor 19 are mechanically coupled to a driving shaft 20 of the engine 17, and when the engine 17 is driven, the hydraulic pump 18 and the generator motor 19 are driven. As a hydraulic driving system, the hydraulic driving system includes an operation valve 33, the boom hydraulic cylinder 14, the arm hydraulic cylinder 15, the bucket hydraulic cylinder 16, the right running hydraulic motor 34, and the left running hydraulic motor 35, and such hydraulic units are driven by using the hydraulic pump 18 as a hydraulic oil supply source to the hydraulic driving system. Furthermore, the operation valve 33 is a flow direction control valve, where a spool (not illustrated) is moved in response to the operation direction of each operation lever 32 so as to regulate the hydraulic oil flow direction to each hydraulic actuator and to supply the hydraulic oil in response to the operation amount of the operation lever 32 to the hydraulic actuator such as the boom hydraulic cylinder 14, the arm hydraulic cylinder 15, the bucket hydraulic cylinder 16, the right running hydraulic motor 34, or the left running hydraulic motor 35. Further, the output of the engine 17 may be transmitted to the generator motor 19 through a PTO (Power Take Off) shaft.

An electric driving system includes a first inverter 21 which is connected to the generator motor 19 through a power cable, a second inverter 22 which is connected to the first inverter 21 through a wiring harness, a transformer 26 which is installed between the first inverter 21 and the second inverter 22 through a wiring harness, a capacitor 25 which is connected to the transformer 26 through a contactor 27 (an electromagnetic contactor), a swing motor 23 which is connected to the second inverter 22 through a power cable, and the like. Furthermore, the contactor 27 generally closes the electric circuit between the capacitor 25 and the transformer 26 so as to become a power distribution state. Meanwhile, when the hybrid controller C2 determines that the electric circuit needs to be opened due to the leakage of electricity or the like, the hybrid controller C2 outputs an instruction signal for changing the power distribution state to the contactor 27 to the interruption state. Then, the contactor 27 which receives the instruction signal from the hybrid controller C2 opens the electric circuit.

The swing motor 23 is mechanically connected to the swing machinery 24 as described above. At least one of the power generated by the generator motor 19 and the power stored in the capacitor 25 becomes the power source of the swing motor 23, and swings the upper swing body 5 through the swing machinery 24. That is, the swing motor 23 swings and accelerates the upper swing body 5 by performing a power running action using the power supplied from any one of the generator motor 19 and the capacitor 25. Further, the swing motor 23 performs a regeneration action when the upper swing body 5 swings and decelerates, and supplies (charges) the power (the regeneration energy) generated by the regeneration action to the capacitor 25. Furthermore, the swing motor 23 is provided with a rotation sensor 55 which detects the rotation speed (the swing motor rotation speed) of the swing motor 23. The rotation sensor 55 may measure the rotation speed of the swing motor 23 in the power running action (the swing acceleration) or the regeneration action (the swing deceleration). A signal which represents the rotation speed measured by the rotation sensor 55 is input to the hybrid controller C2. As the rotation sensor 55, for example, a resolver may be used.

The generator motor 19 supplies (charges) the generated power to the capacitor 25 and supplies the power to the swing motor 23 depending on the status. As the generator motor 19, for example, a SR (switched reluctance) motor is used. Furthermore, even when a synchronous electric motor using a permanent magnet is used instead of the SR motor, it is possible to supply electric energy to the capacitor 25 or the swing motor 23. In a case where the SR motor is used as the generator motor 19, since the SR motor does not use a magnet including expensive rare metal, it is advantageous from the viewpoint of cost. The rotor shaft of the generator motor 19 is mechanically coupled to the driving shaft 20 of the engine 17. With such a structure, the generator motor 19 generates power in a manner such that the rotor shaft of the generator motor 19 rotates by the driving of the engine 17. Further, a rotation sensor 54 is attached to the rotor shaft of the generator motor 19. The rotation sensor 54 measures the rotation speed of the generator motor 19, and a signal which represents the rotation speed measured by the rotation sensor 54 is input to the hybrid controller C2. As the rotation sensor 54, for example, a resolver may be used.

The transformer 26 is installed between the capacitor 25 and the portion of the generator motor 19 and the swing motor 23. The transformer 26 raises the voltage of the power (the charge stored in the capacitor 25) supplied to the generator motor 19 or the swing motor 23 through the first inverter 21 and the second inverter 22. The raised voltage is applied to the swing motor 23 when causing the swing motor 23 to perform the power running action (the swing acceleration) and is applied to the generator motor 19 when assisting the output of the engine 17. Furthermore, the transformer 26 also serves to drop (lower) the voltage when charging the power generated by the generator motor 19 or the swing motor 23 to the capacitor 25. The transformer 26 is provided with a transformer temperature sensor 50 which serves as a transformer temperature detecting sensor which detects the temperature of the transformer 26 as the transformer. A signal which represents the temperature measured by the transformer temperature sensor 50 is input to the hybrid controller C2. Further, a voltage detecting sensor 53 which serves as a voltage detecting sensor for measuring the magnitude of the voltage raised by the transformer 26 or the magnitude of the voltage of the power generated by the regeneration of the swing motor 23 is attached to the wiring harness between the transformer 26 and the portion including the first inverter 21 and the second inverter 22. A signal which represents the voltage measured by the voltage detecting sensor 53 is input to the hybrid controller C2.

In the embodiment, the transformer 26 has a function of raising or lowering the input DC power and outputting the DC power. With such a function is provided, the type of the transformer 26 is not particularly limited. In the embodiment, for example, a transformer called a transformer coupled transformer obtained by the combination of a transformer and two inverters is used as the transformer 26. In addition, a DC-DC converter may be used as the transformer 26. Next, the transformer coupled transformer will be simply described.

Figure 3:
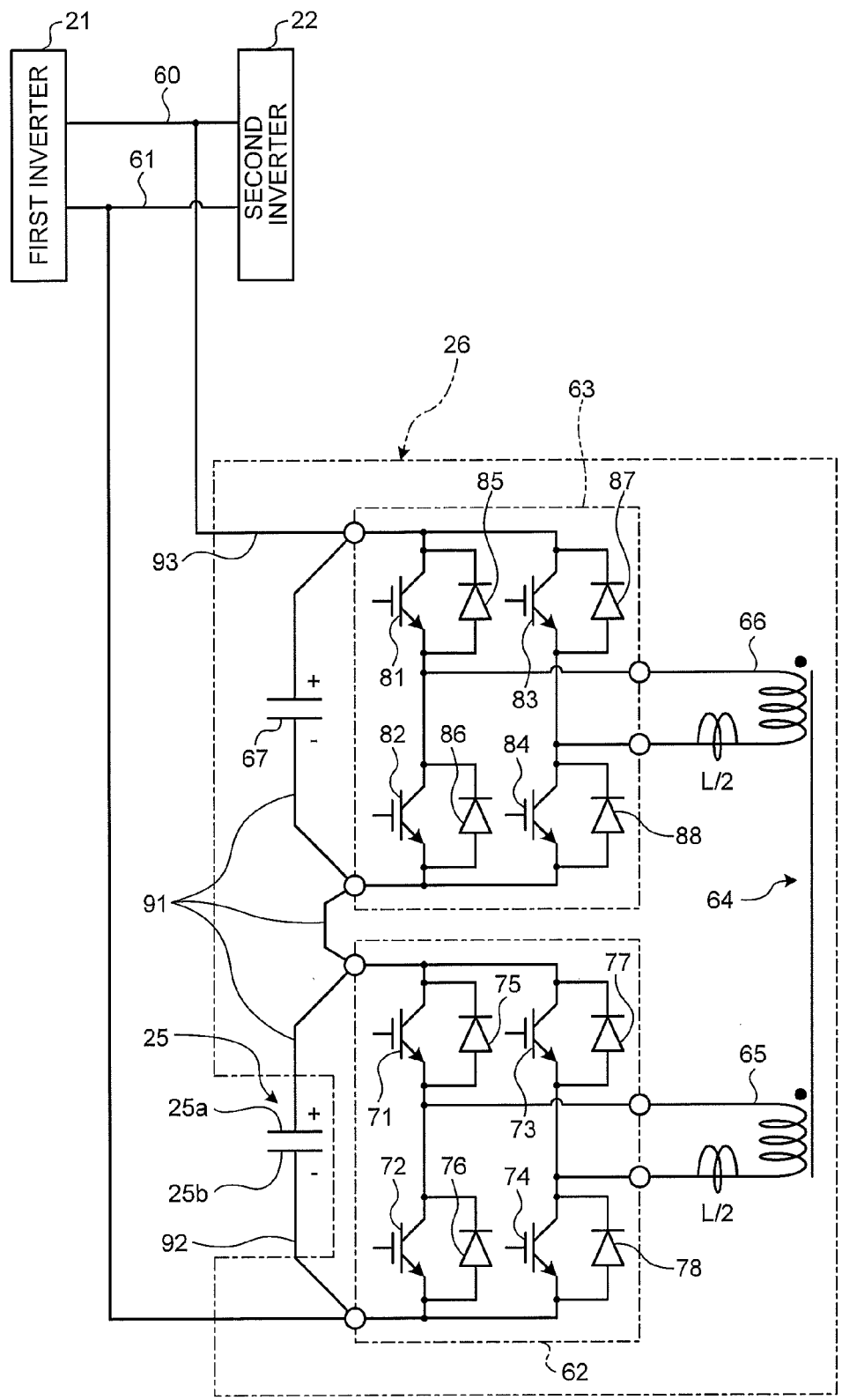
FIG. 3 is a diagram illustrating a transformer coupled transformer as a transformer.

FIG. 3 is a diagram illustrating the transformer coupled transformer as the transformer. As illustrated in FIG. 3, the first inverter 21 and the second inverter 22 are connected to each other through a positive line 60 and a negative line 61. The transformer 26 is connected between the positive line 60 and the negative line 61. The transformer 26 performs an AC (Alternating Current) linkage of a low-transformer 62 as a primary inverter and a high-transformer 63 as a secondary inverter which are two inverters by a transformer 64. In this way, the transformer 26 is the transformer coupled transformer. In the description below, a winding wire ratio between a low-voltage coil 65 and a high-voltage coil 66 of the transformer 64 is set to one to one.

The low-transformer 62 and the high-transformer 63 are electrically connected in series to each other so that the positive electrode of the low-transformer 62 and the negative electrode of the high-transformer 63 have additive polarity. That is, the transformer 26 is connected in parallel to the first inverter 21 so as to have the same polarity.

The low-transformer 62 includes four IGBTs (Isolated Gate Bipolar Transistors) 71, 72, 73, and 74 which are bridge-connected to the low-voltage coil 65 of the transformer 64 and diodes 75, 76, 77, and 78 which are respectively connected in parallel to the IGBTs 71, 72, 73, and 74 so as to have the opposite polarity. The bridge-connection mentioned herein indicates a connection in which one end of the low-voltage coil 65 is connected to the emitter of the IGBT 71 and the collector of the IGBT 72 and the other end thereof is connected to the emitter of the IGBT 73 and the collector of the IGBT 74. The IGBTs 71, 72, 73, and 74 are turned on when a switching signal is applied to the gates thereof, so that a current flows from the collector to the emitter.

A positive terminal 25a of the capacitor 25 is electrically connected to the positive electrode of the IGBT 71 through a positive line 91. The emitter of the IGBT 71 is electrically connected to the collector of the IGBT 72. The emitter of the IGBT 72 is electrically connected to a negative terminal 25b of the capacitor 25 through a negative line 92. The negative line 92 is connected to the negative line 61.

Similarly, the positive terminal 25a of the capacitor 25 is electrically connected to the collector of the IGBT 73 through the positive line 91. The emitter of the IGBT 73 is electrically connected to the collector of the IGBT 74. The emitter of the IGBT 74 is electrically connected to the negative terminal 25b of the capacitor 25 through the negative line 92.

The emitter of the IGBT 71 (the anode of the diode 75) and the collector of the IGBT 72 (the cathode of the diode 76) are connected to one end of the low-voltage coil 65 of the transformer 64, and the emitter of the IGBT 73 (the anode of the diode 77) and the collector of the IGBT 74 (the cathode of the diode 78) are connected to the other end of the low-voltage coil 65 of the transformer 64.

The high-transformer 63 includes four IGBTs 81, 82, 83, and 84 which are bridge-connected to the high-voltage coil 66 of the transformer 64 and diodes 85, 86, 87, and 888 which are respectively connected in parallel to the IGBTs 81, 82, 83, and 84 so as to have opposite polarity. The bridge-connection mentioned herein indicates a configuration in which one end of the high-voltage coil 66 is connected to the emitter of the IGBT 81 and the collector of the IGBT 82 and the other end thereof is connected to the emitter of the IGBT 83 and the collector of the IGBT 84. The IGBTs 81, 82, 83, and 84 are turned on when a switching signal is applied to the gates thereof, so that a current flows from the collector to the emitter.

The collectors of the IGBTs 81 and 83 are electrically connected to the positive line 60 of the first inverter 21 through a positive line 93. The emitter of the IGBT 81 is electrically connected to the collector of the IGBT 82. The emitter of the IGBT 83 is electrically connected to the collector of the IGBT 84. The emitters of the IGBTs 82 and 84 are electrically connected to the positive line 91, that is, the collectors of the IGBTs 71 and 73 of the low-transformer 62.

The emitter of the IGBT 81 (the anode of the diode 85) and the collector of the IGBT 82 (the cathode of the diode 86) are electrically connected to one end terminal of the high-voltage coil 66 of the transformer 64, and the emitter of the IGBT 83 (the collector of the diode 87) and the collector of the IGBT 84 (the cathode of the diode 88) are electrically connected to the other terminal of the high-voltage coil 66 of the transformer 64.

A capacitor 67 is electrically connected between the positive line 93 to which the collectors of the IGBTs 81 and 83 are connected and the positive line 91 to which the emitters of the IGBTs 82 and 84 are electrically connected. The capacitor 67 is used to absorb a ripple current.

The transformer 64 has a leakage inductance of a constant value L. The leakage inductance may be obtained by adjusting a gap between the low-voltage coil 65 and the high-voltage coil 66 of the transformer 64. In FIG. 1, the inductance is divided so that the low-voltage coil 65 has a value of L/2 and the high-voltage coil 66 has a value of L/2.

In the above-described transformer temperature sensor 50, the IGBTs 71, 72, 73, and 74 of the low-transformer 62 and the IGBTs 81, 82, 83, and 84 of the high-transformer 63 are attached in parallel to the low-voltage coil 65 and the high-voltage coil 66 provided in the transformer 64. In the embodiment, overheat suppression control is performed based on the temperatures of the low-voltage coil 65 and the high-voltage coil 66 with respect to an increase in temperature of the transformer 25. Furthermore, the IGBTs 71, 72, 73, and 74 of the low-transformer 62 and the IGBTs 81, 82, 83, and 84 of the high-transformer 63 are also used for the case of an increase in temperature.

The torques of the generator motor 19 and the swing motor 23 are respectively controlled by the first inverter 21 and the second inverter 22 under the control using the hybrid controller C2. In order to measure the magnitude of the DC current input to the second inverter 22, the second inverter 22 is provided with an ammeter 52. A signal which represents the current detected by the ammeter 52 is input to the hybrid controller C2. The amount (the charge amount or the capacitance) of the power stored in the capacitor 25 may be managed by using the magnitude of the voltage as the index. In order to detect the magnitude of the voltage of the power stored in the capacitor 25, a predetermined output terminal of the capacitor 25 is provided with a voltage sensor 28. A signal which represents the voltage detected by the voltage sensor 28 is input to the hybrid controller C2. The hybrid controller C2 monitors the charged amount (the amount of the power (the charge amount or the capacitance)) of the capacitor 25, and performs an energy management in which the power generated by the generator motor 19 is supplied (charged) to the capacitor 25 or is supplied to the swing motor 23 (where the power is supplied for the power running action).

In the embodiment, for example, an electrical double layer capacitor is used as the capacitor 25. Instead of the capacitor 25, a battery which serves as another secondary battery such as a lithium-ion battery or a nickel hydride battery may be used. Further, as the swing motor 23, for example, the permanent magnet type synchronous electric motor is used, but the invention is not limited thereto. The capacitor 25 is provided with a capacitor temperature sensor 51 which serves as a battery temperature sensor for detecting the temperature of the capacitor 25 as the battery. A signal which represents the temperature measured by the capacitor temperature detecting sensor 51 is input to the hybrid controller C2.

The hydraulic driving system and the electric driving system are driven in response to the operation of the operation levers 32 such as a working unit lever, a running lever, and a swing lever which are installed inside the operation room 6 provided inside the vehicle body 2. In a case where the operator of the hybrid excavator 1 operates the operation lever 32 (the swing lever) serving as an operation unit for swinging the upper swing body 5, the operation direction and the operation amount of the swing lever are detected by a potentiometer or a pilot pressure sensor, and the detected operation amount is transmitted as an electric signal to the controller C1 and the hybrid controller C2.

Even when the other operation lever 32 is operated, the electric signal is transmitted to the controller C1 and the hybrid controller C2 in this way. In response to the operation direction and the operation amount of the swing lever or the operation direction and the operation amount of the other operation lever 32, the controller C1 and the hybrid controller C2 control the second inverter 22, the transformer 26, and the first inverter 21 so as to perform the rotation operation (the power running action or the regeneration action) of the swing motor 23 or the power distribution control (the energy management) such as the management (the control for charging or discharging) of the electric energy of the capacitor 25 and the management (the assist for the generation or the engine output and the power running action to the swing motor 23) of the electric energy of the generator motor 19.

A monitor device 30 and a key switch 31 are installed inside the operation room 6 in addition to the operation lever 32. The monitor device 30 includes a liquid crystal panel, an operation button, and the like. Further, the monitor device 30 may be a touch panel obtained by integrating the display function of the liquid crystal panel with the function of the operation button for inputting various information items. The monitor device 30 is an information input and output device which has a function of informing the operator or the service man of the operation state (the engine water temperature state, the failure state of the hydraulic unit, or the fuel remaining amount) of the hybrid excavator 1 and a function of performing the setting or the instruction (the setting of the output level of the engine, the setting of the speed level of the running speed, or the capacitor charge extracting instruction to be described later) desired by the operator with respect to the hybrid excavator 1.

The key switch 31 mainly includes a key cylinder. The key switch 31 starts the starter (the engine starting electric motor) attached to the engine 17 by inserting a key into the key cylinder and rotating the key and drives the engine (for the engine starting). Further, the key switch 31 outputs an instruction of stopping the engine (for the engine stopping) by rotating the key in a direction opposite to the case of starting the engine during the engine driving operation. That is, the key switch 31 is an instruction output unit which outputs an instruction to various electric units of the engine 17 and the hybrid excavator 1.

When the key is rotated (specifically, the key is operated to the off position to be described later) in order to stop the engine 17, the supply (feeding) of the electricity to various electric units from the battery (not illustrated) and the supply of fuel to the engine 17 are interrupted, so that the engine is stopped. The key switch 31 interrupts the feeding of electricity to various electric units from the battery (not illustrated) when the key is rotated to the off (OFF) position, and feeds the electricity to various electric units from the battery (not illustrated) when the key is operated to the on (ON) position. Then, when the key is further rotated from that position to the start (ST) position, the starter (not illustrated) is started through the controller C1, thereby starting the engine. The key rotation position is present at the on (ON) position while the engine 17 is driven after the engine 17 is started.

Furthermore, instead of the key switch 31 which mainly includes the key cylinder, another instruction output unit, for example, a press button type key switch may be employed. That is, the key switch may be configured so that the engine becomes an on (ON) state when a button is pressed once while the engine 17 is stopped, the engine becomes an start (ST) state when the button is pressed further, and the engine becomes an off (OFF) state when the button is pressed while the engine 17 is driven. Further, the key switch may be configured to start the engine 17 as the condition in which the button is continuously pressed while the engine 17 is stopped so that the engine state is switched from the off (OFF) state to the start (ST) state.

The controller C1 is obtained by the combination of a calculation device such as a CPU (Central Processing Unit) and a memory (a storage device). The controller C1 controls the engine 17 and the hydraulic pump 18 based on the instruction signal output from the monitor device 30, the instruction signal output in response to the key position of the key switch 31, and the instruction signal (the signal representing the operation amount or the operation direction) output in response to the operation of the operation lever 32. The engine 17 is an engine in which electronic control may be performed by a common rail type fuel injection device 40. The engine 17 may obtain a target engine output by appropriately controlling the fuel injection amount using the controller C1 and may be driven by setting the engine rotation speed and the torque to be output in response to the load state of the hybrid excavator 1.

The hybrid controller C2 as the overheat suppression control device is obtained by the combination of a calculation device such as a CPU and a memory (a storage device). The hybrid controller C2 controls the first inverter 21, the second inverter 22, and the transformer 26 as described above under the cooperation with the controller C1, and controls the power distribution of the generator motor 19, the swing motor 23, and the capacitor 25. Further, the hybrid controller C2 acquires detection values obtained by various sensors such as the voltage sensor 28, the transformer temperature sensor 50, and the capacitor temperature sensor 51, and performs a method of controlling the working machine according to the embodiment based on the detection values. The method of controlling the working machine according to the embodiment is the control for suppressing the overheat of the transformer 26 and the capacitor 25 when the swing motor 23 performs the regeneration action (the swing deceleration). In the description below, the method of controlling the working machine according to the embodiment is appropriately referred to as the overheat suppression control. The overheat suppression control is realized by an overheat suppression control unit C21 of the hybrid controller C2.

(Overheat Suppression Control)

Figure 4:
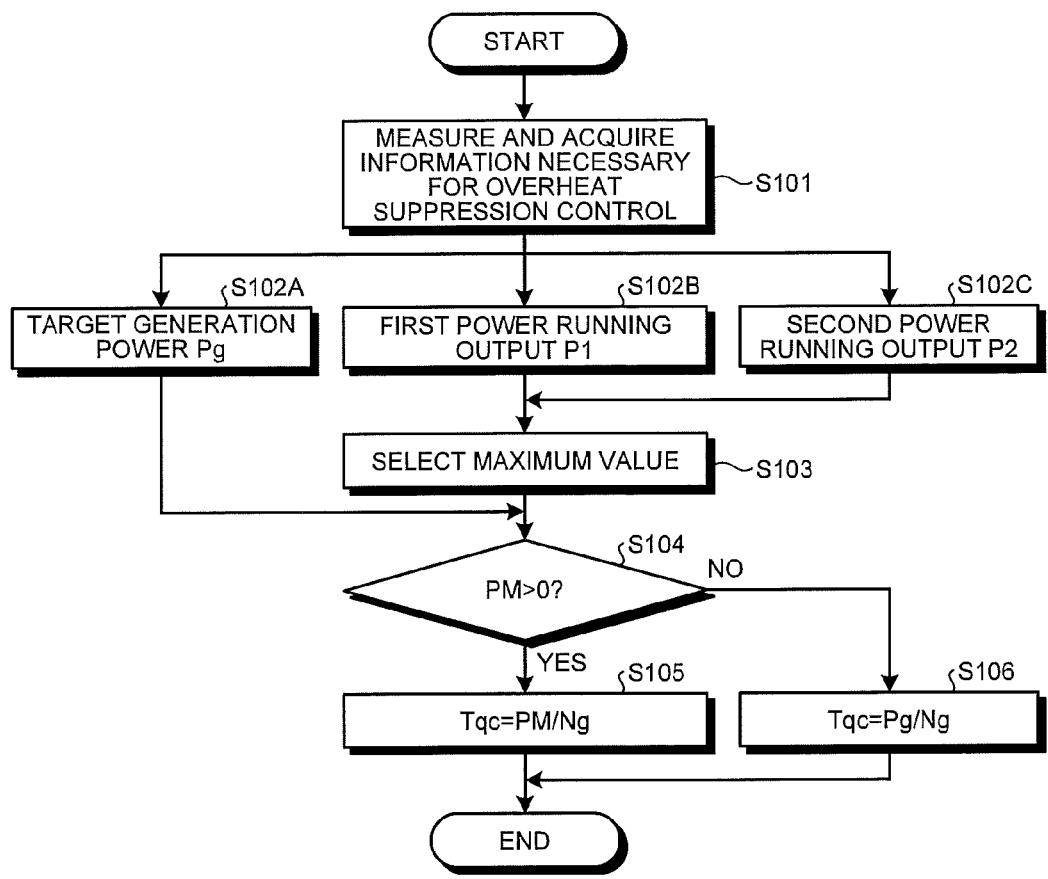
FIG. 4 is a flowchart illustrating a process of overheat suppression control.

FIG. 4 is a flowchart illustrating a process of the overheat suppression control. The overheat suppression control is the control in which the overheat of the transformer 26 and the capacitor 25 is suppressed by changing the amount of the power generated by the regeneration of the swing motor 23 supplied to the capacitor 25 and the amount of the power supplied to the generator motor 19 based on the transformer temperature Tt and the capacitor temperature Tc. The overheat suppression control may be realized by performing a computer program for executing such control by the hybrid controller C2. The computer program is stored in, for example, a storage unit C22 of the hybrid controller C2.

When performing the overheat suppression control, the overheat suppression control unit C21 of the hybrid controller C2 illustrated in FIG. 2 acquires the information necessary for the overheat suppression control by measurement (step S101). Step S101 corresponds to the measurement process of the overheat suppression control. In order to obtain the information necessary for the overheat suppression control, the voltage Vc of the capacitor 25, the power Pm of the swing motor 23, the temperature Tt of the transformer 26, the temperature Tc of the capacitor 25, and the raised voltage Vb are measured in step S101.

The voltage Vc of the capacitor 25 is the voltage across the terminals of the capacitor 25, and is appropriately referred to as the capacitor voltage Vc. The power Pm of the swing motor 23 is the power which is applied to the swing motor 23 or the power (referred to as the regeneration energy or the regeneration power) which is generated by the regeneration of the swing motor 23, and is appropriately referred to as the swing motor power Pm. The temperature Tt of the transformer 26 is the temperature of the coil of the transformer 26, and is appropriately referred to as the transformer temperature Tt. The temperature Tc of the capacitor 25 is the temperature of the cell constituting the capacitor 25, and is appropriately referred to as the capacitor temperature Tc. Furthermore, the transformer temperature sensor 50 is provided at each of a plurality of positions inside the transformer 26, and the representative value (for example, the average value or the maximum value) of the measurement values may be calculated as the transformer temperature Tt. Further, even in the capacitor temperature Tc of the capacitor 25, the capacitor temperature sensor 51 is provided at each of a plurality of positions inside the capacitor 25, and the representative value (for example, the average value or the maximum value) of the measurement values may be calculated as the capacitor temperature Tc.

The capacitor voltage Vc is measured by the voltage sensor 28 illustrated in FIG. 2. The swing motor power Pm is the power (the second inverter power Pi2) of the second inverter 22. When the swing motor 23 performs the power running action (the swing acceleration), the second inverter power Pi2 may be obtained by multiplying the voltage raised by the transformer 26, that is, the raised voltage Vb detected by the voltage detecting sensor 53 by the measurement value of the DC current input to the second inverter 22 and measured by the ammeter 52. The second inverter power Pi2 is set as a positive value when the swing motor 23 performs the power running action (the swing acceleration) and is set as a negative value when the swing motor performs the regeneration action (the swing deceleration). Meanwhile, when the swing motor 23 performs the regeneration action (the swing deceleration), the raised voltage Vb indicates the value of the voltage of the power to be input to the transformer 26. In this way, the swing motor power Pm may be obtained by the measurement value of the voltage detecting sensor 53 and the measurement value of the ammeter 52 illustrated in FIG. 2. The overheat suppression control unit C21 acquires respective measurement values from the voltage detecting sensor 53 and the ammeter 52, and obtains the swing motor power Pm. The swing motor power Pm is obtained in any of the power running action and the regeneration action of the swing motor 23. The swing motor power Pm becomes a positive value when the swing motor 23 performs the power running action and the swing motor power Pm becomes a negative value when the swing motor 23 performs the regeneration action. The transformer temperature Tt is measured by the transformer temperature sensor 50, and the capacitor temperature Tc is measured by the capacitor temperature sensor 51.

Next, the overheat suppression control unit C21 obtains the target generation power Pg (step S102A), the first power running output P1 (step S102B), and the second power running output P2 (step S102C). The target generation power Pg is the target power generated by the generator motor 19. The first power running output P1 and the second power running output P2 are the power to be supplied to the generator motor 19 when the generator motor 19 performs the power running action by at least a part of the power generated by the regeneration of the swing motor 23. The first power running output P1 is determined based on the voltage of the capacitor 25, that is, the capacitor voltage Vc. The second power running output P2 is determined based on the difference between the swing motor power Pm generated by the regeneration of the swing motor 23 and the battery side input limit power Plm based on the temperature (the capacitor temperature Tc) of the capacitor 25 and the temperature (the transformer temperature) Tt of the transformer 26. In the embodiment, step S102A, step S102B, and step S102C are performed in parallel, but these steps may be performed in series. In the case of performing the latter process, the sequence of the process does not matter.

Next, the overheat suppression control unit C21 selects the maximum value of the first power running output P1 and the second power running output P2 (step S103). Here, the selected maximum value is set as PM. Next, when PM is larger than 0 (Yes in step S104), the overheat suppression control unit C21 obtains the instruction value (the torque instruction value) Tqc of the torque of the generator motor 19 by using the maximum value PM (step S105). The torque instruction value Tqc in this case is used to supply a part of the power generated by the regeneration action (the swing deceleration) of the swing motor 23 to the generator motor 19 without being stored in the capacitor 25 so that the generator motor 19 performs the power running action. The sign of the torque instruction value Tqc in this case becomes positive. When PM is larger than 0 (PM>0), the swing motor 23 may generate the power by the regeneration or the swing motor 23 may consume the power by the power running action. As described above, the torque instruction value Tqc is determined in consideration of the capacitor voltage Vc or the transformer temperature Tt and the capacitor temperature Tc. In the case of PM>0 (when PM is larger than 0), the generator motor 19 performs the power running action.

In the case where PM is equal to or smaller than 0 (No in step S104), the overheat suppression control unit C21 obtains the torque instruction value Tqc by using the target generation power Pg. The torque instruction value Tqc in this case is an instruction value for causing the generator motor 19 to perform the regeneration action (the generation), and is a torque instruction value for charging the power generated by the generator motor 19 to the capacitor 25. The sign of the torque instruction value Tqc in this case becomes negative. When PM is equal to or smaller than 0, the swing motor 23 may perform the power running action, that is, the swing motor may generate the power by receiving power or the swing motor 23 may generate the power by the regeneration. When the value of PM is equal to or smaller than 0, the generator motor 19 performs the regeneration action (the generation), and as described above, the torque instruction value Tqc is determined from the target generation power Pg. The torque instruction value Tqc may be obtained by dividing the value of PM or the target generation power Pg by the rotation speed Ng of the generator motor 19 measured by the rotation sensor 54 illustrated in FIG. 2. Furthermore, as the rotation speed Ng, the rotation speed which is measured by the rotation sensor 41 measuring the rotation speed of the engine 17 may be used as the rotation speed Ng. Step S102A to step S106 correspond to the control process. Here, the process (step S101B) of obtaining the first power running output P1 may not be performed, and the subsequent process may be performed by using the second power running output P2 obtained in step S102C as PM in step S103. Next, the target generation power Pg will be described.

(Target Generation Power Pg)

Figure 5:
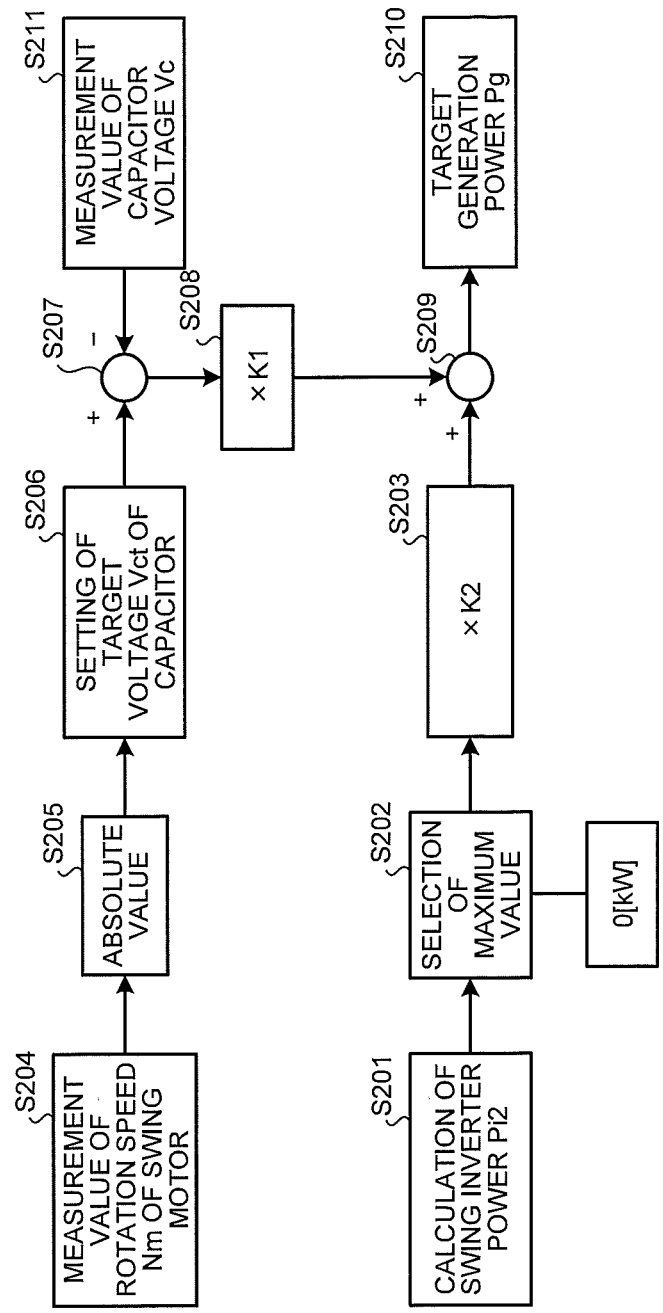
FIG. 5 is a flowchart illustrating a process when obtaining a target generation power.

FIG. 5 is a flowchart illustrating a process when obtaining the target generation power Pg. The hybrid controller C2 sequentially calculates the second inverter power (the swing inverter power) Pi2 (the swing motor power Pm) which is the power of the second inverter 22 as the swing power to be consumed by the swing motor 23, and stores the power in the memory (the storage unit C22 or the memory (not illustrated)) provided in the hybrid controller C2 (step S202). As described above, the second inverter power Pi2 may be obtained by multiplying the voltage raised by the transformer 26, that is, the raised voltage Vb detected by the voltage detecting sensor 53 by the measurement value of the DC current input to the second inverter 22 and measured by the ammeter 52.

Next, the hybrid controller C2 compares the second inverter power Pi2 with 0 (kW) and selects the maximum value (step S202). This is because a process to be described later is performed only in the case where the second inverter power Pi2 is positive, that is, performs the power running action (the swing motor 23 swings in an acceleration state). For this reason, in step S202, a negative value is not output as the second inverter power Pi2. Furthermore, when the second inverter power Pi2 is negative, that is, performs the regeneration action (the swing motor 23 swings in a deceleration state), a process to be described later is not performed.

When the second inverter power Pi2 is larger than 0 (kW), that is, positive, the hybrid controller C2 performs a calculation in which the second inverter power Pi2 is multiplied by a predetermined coefficient K2 (step S203). The specific value of the coefficient K2 is set in consideration of the power which is returned (that is, charged) to the capacitor 25 by the generation of the swing motor 23 when the swing motor 23 performs the regeneration action. Since the power which is larger than that of the power running action is not substantially physically returned (charged) to the capacitor 25 when the swing motor 23 performs the regeneration action, the coefficient K2 needs to be a value equal to or larger than 0. Furthermore, in the calculation in step S203, a calculation may be performed so as to obtain the value smaller than the second inverter power Pi2, and for example, a predetermined integer may be subtracted from the second inverter power Pi2.

The hybrid controller C2 receives a signal (a swing motor rotation speed Nm) which represents the measurement value Nm of the rotation speed (the swing motor rotation speed) of the swing motor 23 measured by the rotation sensor 55 from the rotation sensor 55 in real time (step S204). Subsequently, the hybrid controller C2 obtains the absolute value of the swing motor rotation speed Nm (step S205), and sets the target voltage (the capacitor target voltage) Vct of the capacitor 25 in response to the value (step S206).

Figure 6:
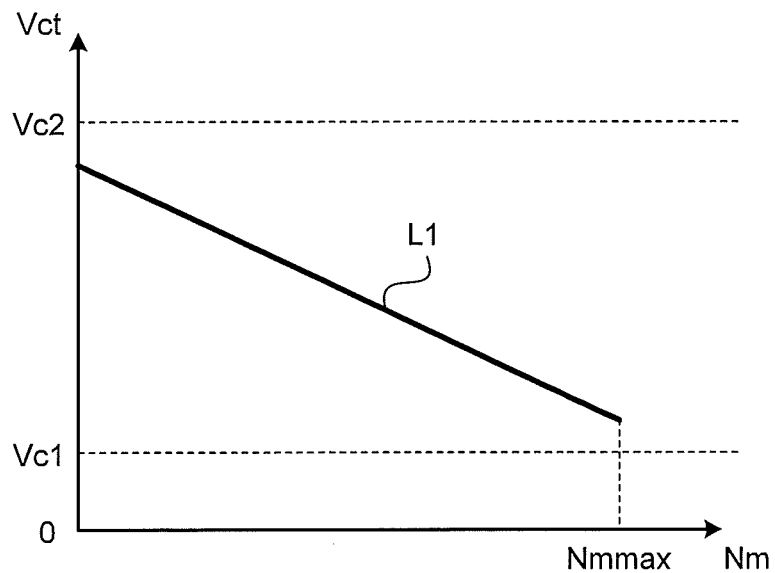
FIG. 6 is a diagram illustrating a relation between an absolute value of a swing motor rotation speed and a capacitor target voltage.

FIG. 6 is a diagram illustrating a relation between the absolute value of the swing motor rotation speed Nm and the capacitor target voltage Vct. In general, the capacitor 25 has an operation voltage range in which the performance thereof may be exhibited. For this reason, it is desirable to set the capacitor target voltage Vct within the operation voltage range regardless of the value of the swing motor rotation speed Nm (characteristic 1). Further, when the absolute value of the swing motor rotation speed Nm is large, the energy which is returned when the swing motor 23 performs the regeneration action (the swing deceleration), that is, the power which is charged to the capacitor 25 is large. For this reason, it is desirable that the capacitor target voltage Vct is set to be smaller as the absolute value of the swing motor rotation speed Nm increases and the energy storage capacity remains (characteristic 2).

The line L1 illustrated in FIG. 6 is set so that the relation between the swing motor rotation speed Nm and the capacitor target voltage Vct satisfies two characteristics described above. In FIG. 6, the operation voltage range of the capacitor 25 is set to the range from Vc1 to Vc2 (Vc1<Vc2). Further, in FIG. 6, in consideration of the case where the hybrid controller C2 performs another control, the range of the capacitor target voltage Vct may be set to be narrower than the range from Vc1 to Vc2 as the operation voltage range. Furthermore, the relation between the swing motor rotation speed Nm and the capacitor target voltage Vct may not be essentially set to be linear when the two characteristics described above are satisfied. Further, the capacitor target voltage Vct may be set to be constant regardless of the swing motor rotation speed Nm.

Subsequently after step S206, the hybrid controller C2 calculates the voltage difference (Vct−Vc) between the set capacitor target voltage Vct and the voltage (the capacitor voltage Vc) of the capacitor 25 which is measured by the voltage sensor 28 illustrated in FIG. 2 in real time (step S211) (step S207), and multiplies the obtained voltage difference by the coefficient K1 (step S208). The coefficient K1 is a predetermined integer, and is a coefficient in which the voltage difference (Vct−Vc) obtained in step S207 is converted into the power value (the dimension of the second inverter power Pi2). For this reason, the coefficient has a physical dimension (herein, a dimension of a current) different from the coefficient K2 described above.

The hybrid controller C2 obtains the sum of the calculation value (Pi2×K2) obtained in step S203 and the calculation value ((Vct−Vc)×K1) obtained in step S208 (step S209), and generates the target generation power Pg by using the obtained sum value (step S210). In step S210, the hybrid controller C2 generates the target generation power Pg only when the output obtained by step S209 is positive, and outputs the generation capability of the generator motor 19 as the target generation power Pg when the generated generation instruction exceeds the generation capability of the generator motor 19. Further, in step S210, a filter of a predetermined frequency may be interposed.

Further, the coefficient K2 may be changed in response to the external air temperature T (for example, Celsius' temperature scale). It is supposed that the construction machine is used in a wide temperature range from a low temperature of 0° C. or less to a high temperature. In general, since the efficiency of the capacitor 25 increases when the external air temperature is high, the coefficient K2 may be decreased as the external air temperature becomes higher. Furthermore, the internal temperature of the capacitor 25 may be used instead of the external air temperature T.

Incidentally, the relation between the coefficient K2 and various conditions is not limited to the case of a linear change, and the change may be set by an appropriate function. Further, the value of the coefficient K1 to be multiplied by the voltage difference between the capacitor target voltage Vct and the capacitor voltage Vc may be changeable. For example, in the value obtained in step S209, when the time in which the value ((Vct−Vc)×K1) obtained in step S208 is larger than a predetermined reference value is continued for a predetermined time, the hybrid controller C2 may perform control in which the value of the coefficient K1 is changed. Further, the voltage difference (Vct−Vc) may be output after the conversion by an appropriate function instead of the multiplication of the coefficient K1. Next, the first power running output will be described.

(First Power Running Output P1)

Figure 7:
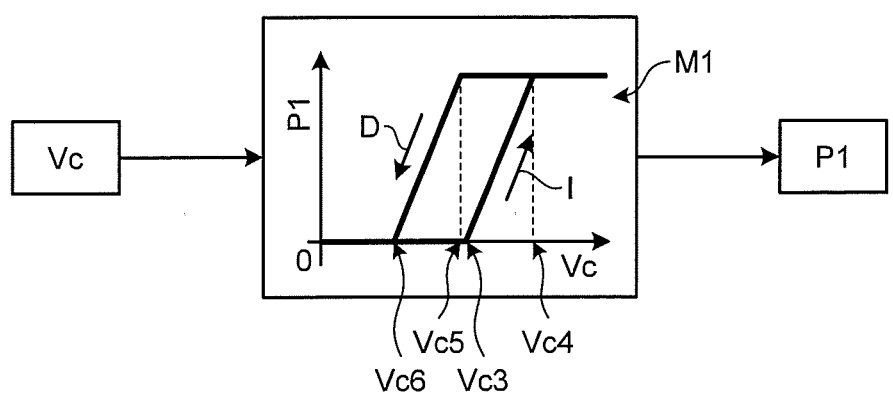
FIG. 7 is a diagram illustrating a procedure of obtaining a first power running output.

FIG. 7 is a diagram illustrating a sequence in which the first power running output P1 is obtained. The first power running output P1 is determined based on the capacitor voltage Vc. The first power running output P1 is a constant value (in this example, 0) in any range when the capacitor voltage Vc increases, and increases with an increase in the capacitor voltage Vc when the capacitor voltage Vc exceeds the predetermined value Vc3. Then, when the capacitor voltage becomes larger than the predetermined value Vc4 (>Vc1), the first power running output P1 becomes a constant value.

The first power running output P1 is a constant value until the capacitor voltage Vc becomes the predetermined value Vc5 (<Vc4) when the capacitor voltage Vc decreases from the value larger than the predetermined value Vc4, and decreases with a decrease in the capacitor voltage Vc when the capacitor voltage Vc becomes smaller than the predetermined value Vc5. Then, when the capacitor voltage Vc becomes smaller than the predetermined value Vc6 (<Vc5), the first power running output P1 becomes a constant value (in this example, 0).

In this way, the first power running output P1 changes with a hysteresis characteristic. That is, the first power running output P1 depends on the process so far. Specifically, in the first power running output P1, the path (the path indicated by the arrow I) when changing with an increase in the capacitor voltage Vc is different from the path (the path indicated by the arrow D) with a decrease in the capacitor voltage Vc. In this way, since the state of the first power running output P1 changes with the hysteresis characteristic, the hunting of the first power running output P1 is suppressed, and hence the stability of the control is improved. Furthermore, the embodiment also includes a configuration in which the first power running output P1 changes without the hysteresis characteristic.

The relation between the first power running output P1 and the capacitor voltage Vc is described in, for example, the map M1 illustrated in FIG. 7, and is stored in the storage unit C22 of the hybrid controller C2 illustrated in FIG. 2. When obtaining the first power running output P1, the overheat suppression control unit C21 illustrated in FIG. 2 reads out the map M1 from the storage unit C22, and acquires the first power running output P1 corresponding to the capacitor voltage Vc measured in step S101 of FIG. 4 from the map M1. In this way, the first power running output P1 is obtained. Next, the second power running output P2 will be described.

(Second Power Running Output P2)

Figure 8:
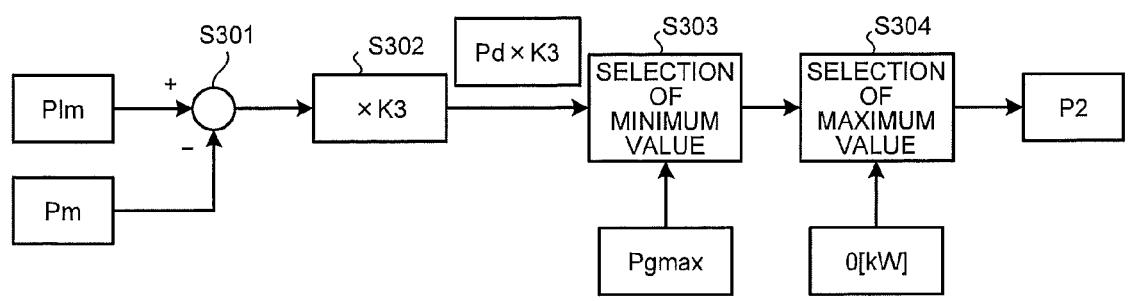
FIG. 8 is a flowchart illustrating a procedure of obtaining a second power running output.

FIG. 8 is a flowchart illustrating a sequence in which the second power running output P2 is obtained. The second power running output P2 may be obtained based on the difference between the battery side input limit power Plm and the input and output side power as the power to be consumed or generated by the swing motor 23, that is, the swing motor power Pm. When obtaining the second power running output P2, the overheat suppression control unit C21 illustrated in FIG. 2 obtains the difference Pd (=Plm−Pm) between the battery side input limit power Plm and the swing motor power Pm (step S301). The battery side input limit power Plm is the input limit of the transformer 26 or the capacitor 25 which is determined based on at least the temperature (the transformer temperature Tt) of the transformer 26 and the temperature (the capacitor temperature Tc) of the capacitor 25. The battery side input limit power Plm will be described later.

Next, the overheat suppression control unit C21 multiplies the difference Pd by the gain K3 (step S302). Subsequently, the overheat suppression control unit C21 compares the maximum output Pgmax as the maximum value generated by the generator motor 19 illustrated in FIG. 2 with the value (Pd×K3) obtained by multiplying the difference Pd by the gain K3, and selects the minimum value (step S303). The process is performed in step S303 so that the value equal to or larger than the maximum output Pgmax of the generator motor 19 is not determined as the second power running output P2. The maximum output Pgmax is a value which is the capability of the generator motor 19 and is stored in the storage unit C22 in advance. Next, the value selected in step S303 is compared with 0 (kW), and the maximum value is selected (step S304). The process is performed in step S304 so as not to output a negative value. The value selected in step S304 is the second power running output P2. In this way, the second power running output P2 is obtained. Next, the battery side input limit power Plm will be described.

(Battery Side Input Limit Power Plm)

Figure 9:
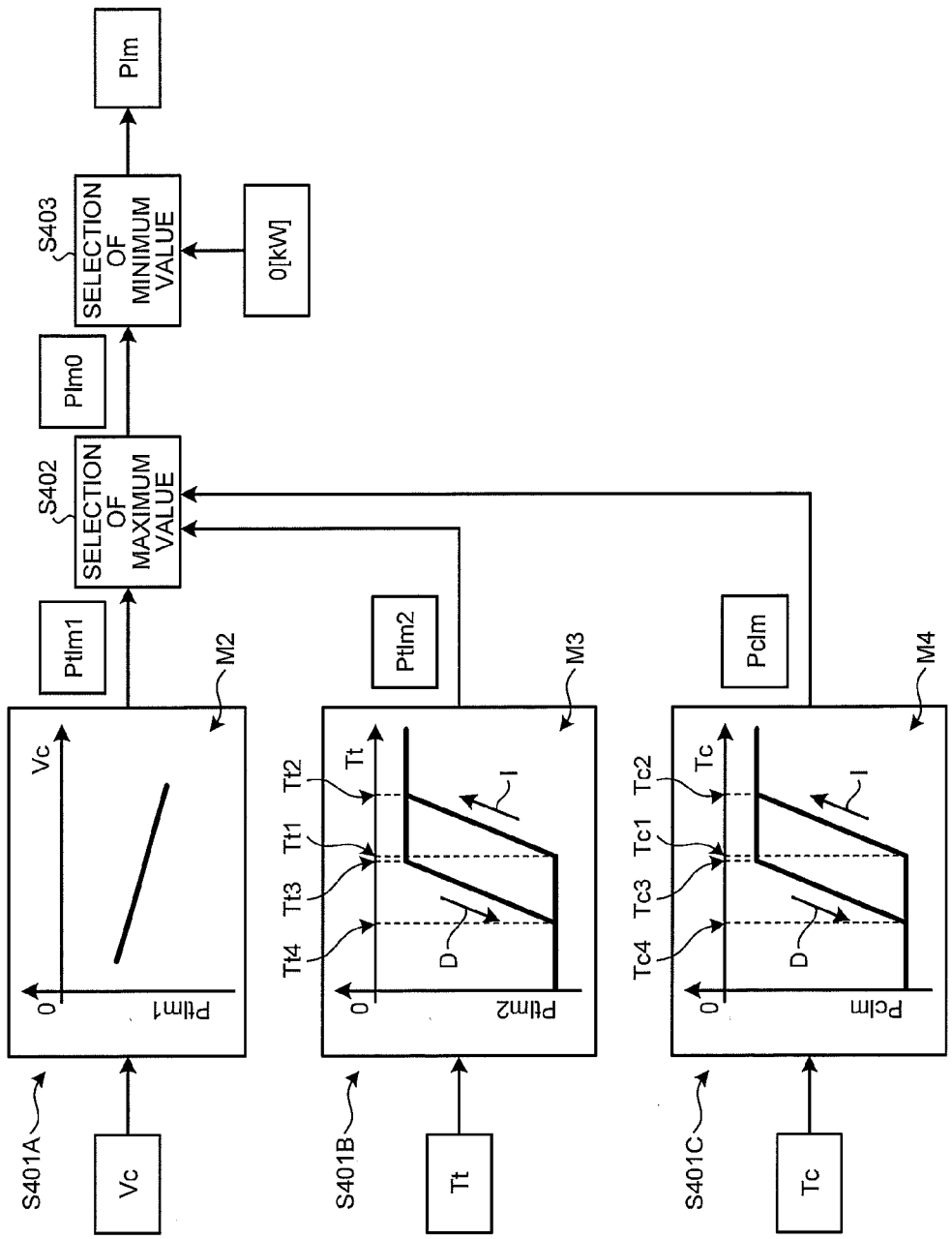
FIG. 9 is a flowchart illustrating a procedure of obtaining a battery side input limit.

FIG. 9 is a flowchart illustrating a sequence in which the battery side input limit power Plm is obtained. The battery side input limit power Plm is determined based on the first transformer input limit power Ptlm1 determined by the capacitor voltage Vc, the second transformer input limit power Ptlm2 determined by the transformer temperature Tt, and the battery input limit power Pclm determined by the capacitor temperature Tc. When obtaining the battery side input limit power Plm, the overheat suppression control unit C21 illustrated in FIG. 2 obtains the first transformer input limit power Ptlm1 corresponding to the capacitor voltage Vc by using the map M2 (step S401A), obtains the second transformer input limit power Ptlm2 corresponding to the transformer temperature Tt by using the map M3 (step S401B), and obtains the battery input limit power Pclm corresponding to the capacitor temperature Tc by using the map M4 (step S401C). In this example, step S401A, step S401B, and step S401C are performed in parallel, but may be performed in series. In the case of the process performed in series, the sequence does not matter.

Next, the overheat suppression control unit C21 compares the first transformer input limit power Ptlm1, the second transformer input limit power Ptlm2, and the battery input limit power Pclm with one another, and selects the maximum value (step S402). The value selected in step S402 is set as Plm0. In this example, the power when charging the capacitor 25 is set as a negative value, and the power when discharging the capacitor 25 is set as a positive value. In step S402, the negative values are compared with one another, and hence when the maximum value is selected, the absolute value of the selected value decreases.

Next, the overheat suppression control unit C21 compares Plm0 with 0 (kW), and selects the minimum value (step S403). This is because a positive value is not output as the battery side input limit power Plm. The value selected in step S403 is the battery side input limit power Plm. In this way, the battery side input limit power Plm is obtained. Next, the first transformer input limit power Ptlm1, the second transformer input limit power Ptlm2, and the battery input limit power Pclm will be described.

(First Transformer Input Limit Power Ptlm1)

As illustrated in the map M2 of FIG. 9, the first transformer input limit power Ptlm1 is determined by the magnitude of the capacitor voltage Vc. In this example, the first transformer input limit power Ptlm1 decreases as the capacitor voltage Vc increases. Since the first transformer input limit power Ptlm1 is a negative value, the absolute value increases as the capacitor voltage Vc increases. This is because the capacitor 25 has a characteristic in which the power which may be input also increases as the capacitor voltage Vc increases. The relation between the first transformer input limit power Ptlm1 and the capacitor voltage Vc is described in the above-described map M2. The map M2 is stored in the storage unit C22 of the hybrid controller C2 illustrated in FIG. 2, and is read out by the overheat suppression control unit C21 when obtaining the battery side input limit power Plm.

(Second Transformer Input Limit Power Ptlm2)

As illustrated in FIG. 9, the second transformer input limit power Ptlm2 is determined by the transformer temperature Tt. In this example, the second transformer input limit power Ptlm2 is a constant value in a certain range when the transformer temperature Tt increases, and increases with an increase in the transformer temperature Tt when the transformer temperature Tt exceeds the predetermined value Tt1. Since the second transformer input limit power Ptlm2 is a negative value, the absolute value decreases as the transformer temperature Tt increases. When the transformer temperature Tt becomes larger than the predetermined value Tt2 (>Tt1), the second transformer input limit power Ptlm2 becomes a constant value.

The second transformer input limit power Ptlm2 is a constant value until the transformer temperature Tt becomes the predetermined value Tt3 (<Tt2) when the transformer temperature Tt decrease from the value larger than the predetermined value Tt2, and decreases with a decrease in the transformer temperature Tt when the transformer temperature Tt becomes smaller than the predetermined value Tt3. In this case, the absolute value of the second transformer input limit power Ptlm2 increases. Then, when the transformer temperature Tt becomes smaller than the predetermined value Tt4 (<Tt3), the second transformer input limit power Ptlm2 becomes a constant value.

In this way, the second transformer input limit power Ptlm2 changes with a hysteresis characteristic. That is, the second transformer input limit power Ptlm2 depends on the process so far. Specifically, in the second transformer input limit power Ptlm2, the path (the path indicated by the arrow I) when changing with an increase in the transformer temperature Tt is different from the path (the path indicated by the arrow D) when changing with a decrease in the transformer temperature Tt. In this way, since the state of the second transformer input limit power Ptlm2 changes with the hysteresis characteristic, the hunting of the second transformer input limit power Ptlm2 is suppressed, and hence the stability of the control is improved. Furthermore, the embodiment also includes a configuration in which the second transformer input limit power Ptlm2 changes without the hysteresis characteristic. The relation between the second transformer input limit power Ptlm2 and the transformer temperature Tt is described in the above-described map M3. The map M3 is stored in the storage unit C22 of the hybrid controller C2 illustrated in FIG. 2, and is read out by the overheat suppression control unit C21 when obtaining the battery side input limit power Plm.

(Battery Input Limit Power Pclm)

As illustrated in FIG. 9, the battery input limit power Pclm is determined by the capacitor temperature Tc. In this example, the battery input limit power Pclm is a constant value in a certain range when the capacitor temperature Tc increases, and increases with an increase in the capacitor temperature Tc when the capacitor temperature Tc exceeds the predetermined value Tc1. Since the battery input limit power Pclm is a negative value, the absolute value decreases as the capacitor temperature Tc increases. When the capacitor temperature Tc becomes larger than the predetermined value Tc2 (>Tc1), the battery input limit power Pclm becomes a constant value.

The battery input limit power Pclm is a constant value until the capacitor temperature Tc becomes the predetermined value Tc3 (<Tc2) when the capacitor temperature Tc decreases from the value larger than the predetermined value Tc2, and decreases with a decrease in the capacitor temperature Tc when the capacitor temperature Tc becomes smaller than the predetermined value Tc3. In this case, the absolute value of the battery input limit power Pclm increases. Then, when the capacitor temperature Tc becomes smaller than the predetermined value Tc4 (<Tc3), the battery input limit power Pclm becomes a constant value.

In this way, the battery input limit power Pclm changes with the hysteresis characteristic. That is, the battery input limit power Pclm depends on the process so far. Specifically, in the battery input limit power Pclm, the path (the path indicated by the arrow I) when changing with an increase in the capacitor temperature Tc is different from the path (the path indicated by the arrow D) when changing with a decrease in the capacitor temperature Tc. In this way, since the state of the battery input limit power Pclm changes with the hysteresis characteristic, the hunting of the battery input limit power Pclm is suppressed, and hence the stability of the control is improved. Furthermore, the embodiment also includes a configuration in which the battery input limit power Pclm changes without the hysteresis characteristic. The relation between the battery input limit power Pclm and the capacitor temperature Tc is described in the above-described map M4.

The map M4 is stored in the storage unit C22 of the hybrid controller C2 illustrated in FIG. 2, and is read out by the overheat suppression control unit C21 when obtaining the battery side input limit power Plm.

As described above, the second power running output P2 is based on the difference Pd between the battery side input limit power Plm and the swing motor power Pm. When the difference Pd is larger than 0, that is, a positive value, the swing motor power Pm is the power which is generated by the regeneration (the swing deceleration) of the swing motor 23, and becomes larger than the battery side input limit power Plm. In this case, when the entire swing motor power Pm is stored in the capacitor 25 through the transformer 26, the power which exceeds at least one input limit of the transformer 26 and the capacitor 25 is supplied thereto, and hence there is a possibility that the overheat may occur. For this reason, in the overheat suppression control, when the value of the second power running output P2 is larger than 0, at least a part of the power which is generated by the regeneration of the swing motor 23 is supplied to the generator motor 19, so that the power running action of (the power consumption) of the generation motor is performed. The battery side input limit power Plm which is used when obtaining the second power running output P2 is set based on the transformer temperature Tt and the capacitor temperature Tc as described above (see FIG. 9). For this reason, the influence of such a temperature with respect to the transformer 26 and the capacitor 25 may be reflected in the second power running output P2 (see FIG. 8). With such a configuration, the power which is supplied to the capacitor 25 through the transformer 26 may become smaller than the input limits of the transformer 26 and the capacitor 25. As a result, since the loss, that is, the heat generation amount of the transformer 26 and the capacitor 25 may be reduced, the overheat of the transformer 26 and the capacitor 25 may be effectively suppressed.

Further, the second transformer input limit power Ptlm2 is set so that the absolute value thereof decreases when the transformer temperature Tt increases, and the battery input limit power Pclm is set so that the absolute value thereof decrease when the capacitor temperature Tc increases. For this reason, the amount (the power consumption) of the power running action of the generator motor 19 changes in response to an increase in the temperature of each of the transformer 26 and the capacitor 25. That is, at least a part of the power (the regeneration power) which is generated by the regeneration of the swing motor 23 is supplied to the generator motor 19. With such a configuration, the overheat suppression control may suppress degradation in fuel consumption as minimal as possible during the normal operation of the hybrid excavator 1 illustrated in FIGS. 1 and 2. When the power which is generated by the regeneration of the swing motor 23 is supplied to the generator motor 19, the energy is discarded by the power running action (the power consumption) of the generator motor 19. Basically, when the discarded energy is stored (charged) in the capacitor 25, the hybrid excavator 1 does not need to drive the engine 17 for supplementing the discarded energy. That is, the generation of the generator motor 19 is not needed, and hence the low fuel consumption may be obtained. However, since there is a need to prevent an excessive increase in the temperature of the transformer 26 and the capacitor 25, the overheat suppression control of the embodiment is used. According to the overheat suppression control of the embodiment, only when the temperatures of the transformer 26 and the capacitor 25 increase, the regeneration power which is generated by the swing motor 23 is supplied to the generator motor 19 so as to perform the power running action thereof. For this reason, the overheat suppression control of the embodiment does not cause any influence in the normal operation (when the transformer 26 and the capacitor 25 are maintained in a normal temperature), and may suppress degradation in the fuel consumption in the normal operation as minimal as possible.

Further, since the overheat suppression control changes the amount of the power running action of the generator motor 19 when the temperatures of the transformer 26 and the capacitor 25 increase, the capacitor voltage Vc may be easily maintained highly. In the capacitor 25, the input and output currents decrease as the capacitor voltage Vc increases, and hence the heat generation amount may be decreased. Further, there is an advantage in which the input limit increases. As described above, since the overheat suppression control may maintain the capacitor voltage Vc highly, the capacitor 25 may be operated at the more advantageous condition, and the swing motor 23 may be frequently operated in accordance with only the power discharged from the capacitor 25.

Further, the overheat suppression control does not change the input and the output of the swing motor 23, that is, the swing motor power Pm when obtaining the second power running output P2. For this reason, there is no influence on the swing performance when swinging the upper swing body 5 illustrated in FIG. 1.

Further, the overheat suppression control does not change parameters such as the target generation power Pg and the coefficient K2 of the generator motor 19 in response to the transformer temperature Tt or the capacitor temperature Tc. For this reason, it is possible to suppress a change in generation state (an increase and a decrease in generation amount) of the generator motor 19 by a working state such as excavation using the hybrid excavator 1 illustrated in FIG. 1. For example, since the overheat suppression control may suppress an increase and a decrease in generation amount of the generator motor 19 during the excavation using the hybrid excavator 1, a change in excavating force may be suppressed, and hence any influence on the working performance does not occur. That is, an increase and a decrease in generation amount of the generator motor 19 during the excavation increases and decreases the pump absorption horsepower of the hydraulic pump 18. The engine output is the sum of the generation amount of the generator motor 19 and the pump absorption horsepower of the hydraulic pump 18. When the generation amount increases, the pump absorption horsepower decreases. Meanwhile, when the generation amount decreases, the pump absorption horsepower increases. That is, the engine output becomes constant. In this way, when the pump absorption horsepower increases and decreases with an increase and a decrease in the generation amount, the flow rate of the hydraulic oil which is discharged from the hydraulic pump 18 changes, and hence the flow rate of the hydraulic oil supplied to each hydraulic actuator of the working unit 3 changes. As a result, the motion of the working unit 3 changes, so that the operator feels uncomfortable and the working performance is influenced. According to the embodiment, since the overheat suppression control is performed only in the case of regenerating the swing motor 23, it is possible to reduce the influence on the working performance when performing the excavation using the hybrid excavator 1.

Figure 10:
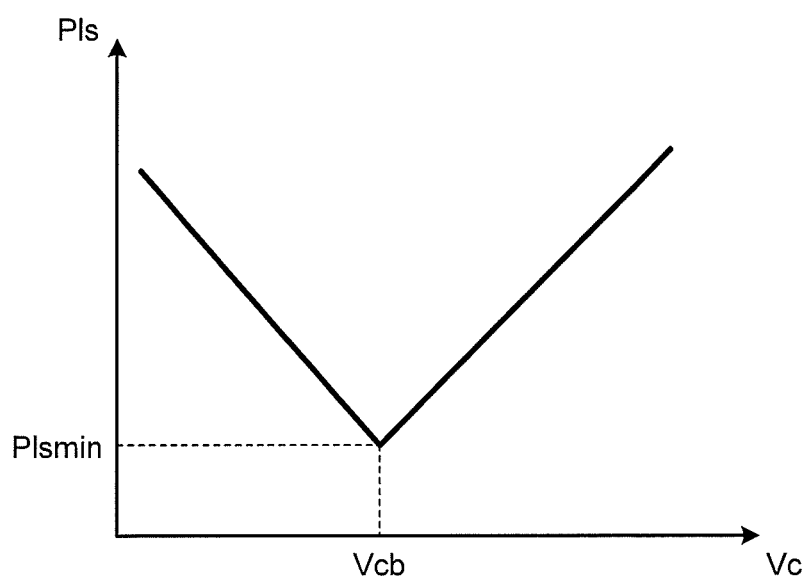
FIG. 10 is a conceptual diagram illustrating a relation between a loss of a transformer and a capacitor voltage.

FIG. 10 is a conceptual diagram illustrating a relation between the loss Pls of the transformer 26 and the capacitor voltage Vc. In particular, when the transformer coupled transformer is used as the transformer 26, the loss (the transformer loss) Pls of the transformer 26 becomes the minimum value Plsmin when the capacitor voltage Vc is Vcb. In the capacitor 25, since the input and output currents decrease as the capacitor voltage Vc increases, the heat generation amount may be decreased, but the characteristic of the transformer 26 has a value (Vcb) of the capacitor voltage Vc when the transformer loss Pls becomes minimal in the characteristic of the transformer 26 as described above. For this reason, when a voltage higher than the value (Vcb) of the capacitor voltage is applied to the transformer 26, the transformer loss Pls increases, so that the heat generation amount of the transformer 26 increases. When there is a big difference between the capacitor voltage Vc for starting the power running action of the generator motor 19 and the voltage Vcb in which the transformer loss Pls becomes minimal, the transformer loss Pls increases compared to the case where the overheat of the transformer 26 is suppressed by suppressing the power passing through the transformer 26, and hence there is a possibility that the overheat of the transformer 26 may easily occur.

When the capacitor voltage Vc upon starting the power running action of the generator motor 19 changes, there is a possibility that the operation state of the hybrid excavator 1 illustrated in FIG. 1 may be influenced in addition to the case of the regeneration of the swing motor 23. For example, when starting the work by the operation of the operator when the engine 17 illustrated in FIG. 2 is in an idling state, the power running action of the generator motor 19 is performed so as to improve the responsiveness of the working unit 3, thereby helping (assisting) the engine 17. For this reason, when the engine 17 is in an idling state, the capacitor voltage Vc is maintained relatively highly, and when starting the next work, there is a need to sufficiently help (assist) the engine 17 by the generator motor 19. However, as described above, when the capacitor voltage Vc upon starting the power running action of the generator motor 19 is set to a value (the voltage Vcb illustrated in FIG. 10) in which the transformer loss Pls of the transformer 26 becomes minimal, the standby voltage of the capacitor 25 is set to be low. For this reason, there is a possibility that the amount (the assist amount) of helping the output of the engine 17 by the generator motor 19 is not ensured when starting the work in a case where the engine 17 is in an idling state.

The overheat suppression control does not need to change the setting of the capacitor voltage Vc when starting the power running action of the generator motor 19, and changes the power running action amount of the generator motor 19, that is, the supply amount (the power consumption amount) of the power (the regeneration power) generated by the regeneration of the swing motor 23 to the generator motor 19 based on the battery side input limit power Plm. Since the overheat suppression control may control the amount of the power to be input to the transformer 26 and the capacitor 25 in this way, it is possible to appropriately reduce the losses of both the transformer 26 and the capacitor 25, that is, the heat generation amount.

In this way, the overheat suppression control drastically reduces the input to the transformer 26 and the capacitor 25 when regenerating the swing motor 23 without largely influencing the charging and discharging balance other than the case of the regeneration of the swing motor 23, and hence may suppress the heat thereof.

While the embodiment has been described, the embodiment is not limited to the above-described content. In the embodiment, a description is made in which the hybrid excavator 1 includes the swing motor 23 as the electric motor which performs the swing acceleration (the power running action) and the swing deceleration (the regeneration action) of the upper swing body 5. However, the hybrid excavator 1 may include the swing motor 23 and the hydraulic motor which are integrated with each other. That is, when swinging the upper swing body 5 of the hybrid excavator 1 in an acceleration state, the hydraulic motor may help (assist) the rotation of the swing motor 23. Even in this case, the swing motor 23 performs the generation action so as to generate the regeneration power when performing the swing deceleration (the regeneration action). Further, the above-described components include a component which may be easily supposed by the person skilled in the art, a component which has substantially the same configuration, and a so-called equivalent component. Further, the above-described components may be appropriately combined with each other. Further, various omissions, replacements, and modifications of the components may be performed in the scope without departing from the spirit of the embodiment. Further, the electric motor is not limited to the swing motor which swings the upper swing body of the hybrid excavator.

REFERENCE SIGNS LIST 1 hybrid excavator
17 engine
19 generator motor
21 first inverter
22 second inverter
23 swing motor
25 capacitor
26 transformer
28 voltage sensor
41, 54, 55 rotation sensor
50 transformer temperature sensor
51 capacitor temperature sensor
52 ammeter
53 voltage detecting sensor
C1 controller
C2 hybrid controller
C21 overheat suppression control unit
C22 storage unit
M1, M2, M3, M4 map
P1 first power running output
P2 second power running output
Pclm battery input limit power
Pg target generation power
Pgmax maximum output
Plm battery side input limit
Pm swing motor power
Ptlm1 first transformer input limit power
Ptlm2 second transformer input limit power
Tc capacitor temperature
Tt transformer temperature
Vc capacitor voltage

The invention claimed is:

1. A hybrid working machine comprising:
an internal combustion engine;
a generator motor which is connected to an output shaft of the internal combustion engine;
a battery which stores power generated by the generator motor and supplies the power to the generator motor;
an electric motor which is driven by at least one of the power generated by the generator motor and the power stored in the battery;
a transformer which is installed between the battery and the generator motor and between the battery and the electric motor;
a transformer temperature detecting sensor which detects a temperature of the transformer;
a battery temperature detecting sensor which detects a temperature of the battery;

a voltage sensor which detects a voltage of the battery; and
an overheat suppression control device which obtains a first transformer input limit power corresponding to the voltage detected by the voltage sensor and changes the amount of the power regenerated by the electric motor supplied to the battery and the amount of the power regenerated by the electric motor supplied to the generator motor based on the temperature of the transformer detected by the transformer temperature detecting sensor and the temperature of the battery detected by the battery temperature detecting sensor and the first transformer input limit power, and
wherein the overheat suppression control device changes the amount of the power regenerated by the electric motor supplied to the battery and the amount of the power regenerated by the electric motor supplied to the generator motor based on a magnitude relation of a first power running output that is determined based on voltage of the battery and allow the generator motor to perform power running and a second power running output that is determined based on input and output power of the electric motor and battery side input limit power based on the temperature of the battery and the temperature of the transformer and allow the generator motor to perform power running.

2. The hybrid working machine according to claim 1,
wherein the battery side input limit power is determined based on first transformer input limit power determined by the voltage of the battery, second transformer input limit power determined by the temperature of the transformer, and battery input limit power determined by the temperature of the battery.

3. The hybrid working machine according to claim 2,
Wherein the second transformer input limit power is constant up to a predetermined temperature when the temperature of the transformer increases, and
the battery input limit power is constant up to a predetermined temperature when the temperature of the battery increases.

4. The hybrid working machine according to claim 3,
wherein in the first power running output, a path changing with an increase in voltage of the battery is different from a path changing with a decrease in voltage of the battery,
in the second transformer input limit power, a path changing with an increase in temperature of the transformer is different from a path changing with a decrease in temperature of the transformer, and
in the battery input limit power, a path changing with an increase in temperature of the battery is different from a path changing with a decrease in temperature of the battery.

5. The hybrid working machine according to claim 1,
wherein in the first power running output, a path changing with an increase in voltage of the battery is different from a path changing with a decrease in voltage of the battery.

6. The hybrid working machine according to claim 1,
wherein the overheat suppression control device changes the amount of the power regenerated by the electric motor supplied to the battery and the amount of the power regenerated by the electric motor supplied to the generator motor based on second power running output that is determined based on the input and output power of the electric motor and the battery side input limit power based on the temperature of the battery and the temperature of the transformer and allow the generator motor to perform power running.

7. The hybrid working machine according to claim 1,
wherein when the electric motor performs power running, the overheat suppression control device decreases a target value of power generated by the generator motor as a rotation speed of the electric motor increases.

8. The hybrid working machine according to claim 1,
wherein the electric motor swings an upper swing body of an excavator.

9. A method of controlling a hybrid working machine including an internal combustion engine, a generator motor which is connected to an output shaft of the internal combustion engine, a battery which stores power generated by the generator motor and supplies the power to the generator motor, an electric motor which is driven by at least one of the power generated by the generator motor and the power stored in the battery, and a transformer which is installed between the battery and the generator motor and between the battery and second generator, the method comprising:
a measurement step of measuring at least a temperature of the transformer and a temperature of the battery;
a control step of controlling the amount of the power regenerated by the electric motor supplied to the battery and the amount of the power regenerated by the electric motor supplied to the generator motor to be changed based on the temperature of the transformer and the temperature of the battery; and
wherein in the control step, the amount of the power regenerated by the electric motor supplied to the battery and the amount of the power regenerated by the electric motor supplied to the generator motor is changed based on a first power running output that is determined based on voltage of the battery and allow the generator motor to perform power running and a second power running output that is determined based on input and output power of the electric motor and battery side input limit power based on the temperature of the battery and the temperature of the transformer and allow the generator motor to perform power running.

10. The method of controlling a hybrid working machine according to claim 9,
wherein the battery side input limit power is determined based on first transformer input limit power determined by the voltage of the battery, second transformer input limit power determined by the temperature of the transformer, and battery input limit power determined by the temperature of the battery.

11. The method of controlling a hybrid working machine according to claim 10,
wherein the second transformer input limit power is constant up to a predetermined temperature when the temperature of the transformer increases, and
the battery input limit power is constant up to a predetermined temperature when the temperature of the battery increases.

12. The method of controlling a hybrid working machine according to claim 11,
wherein in the first power running output, a path changing with an increase in voltage of the battery is different from a path changing with a decrease in voltage of the battery,
in the second transformer input limit power, a path changing with an increase in temperature of the transformer is different from a path changing with a decrease in temperature of the transformer, and in the battery input limit power, a path changing with an increase in temperature of the battery is different from a path changing with a decrease in temperature of the battery.

13. The method of controlling a hybrid working machine according to claim 9,
wherein in the first power running output, a path changing with an increase in voltage of the battery is different from a path changing with a decrease in voltage of the battery.

14. The method of controlling a hybrid working machine according to claim 9,
wherein in the control step, the amount of the power regenerated by the electric motor supplied to the battery and the amount of the power regenerated by the electric motor supplied to the generator motor is changed based on second power running output that is determined based on input and output power of the electric motor and battery side input limit power based on the temperature of the battery and the temperature of the transformer and allow the generator motor to perform power running.

15. The method of controlling a hybrid working machine according to claim 9,
wherein in the control step, when the electric motor performs power running, a target value of power generated by the generator motor decreases as a rotation speed of the electric motor increases.

\* \* \* \* \*